United States Patent
Narasimhan et al.

(10) Patent No.: US 12,093,544 B2
(45) Date of Patent: *Sep. 17, 2024

(54) OPERATIONAL FEATURE ACTIVATION/DISABLING

(71) Applicant: Hewlett Packard Enterprise Development LP, Spring, TX (US)

(72) Inventors: Sriram Narasimhan, Cupertino, CA (US); Alex Veprinsky, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,330

(22) Filed: Jun. 22, 2023

(65) Prior Publication Data

US 2023/0333757 A1    Oct. 19, 2023

Related U.S. Application Data

(63) Continuation of application No. 17/447,104, filed on Sep. 8, 2021, now Pat. No. 11,687,258.

(51) Int. Cl.
*G06F 12/00* (2006.01)
*G06F 3/06* (2006.01)

(52) U.S. Cl.
CPC .......... *G06F 3/0632* (2013.01); *G06F 3/0604* (2013.01); *G06F 3/065* (2013.01); *G06F 3/0659* (2013.01); *G06F 3/0679* (2013.01)

(58) Field of Classification Search
CPC ...... G06F 3/0632; G06F 3/0604; G06F 3/065; G06F 3/0659; G06F 3/0679

USPC ........................................................ 711/103
See application file for complete search history.

(56) References Cited

U.S. PATENT DOCUMENTS

| | | |
|---|---|---|
| 5,777,984 A | 7/1998 | Gun et al. |
| 5,812,527 A | 9/1998 | Kline et al. |
| 5,828,782 A | 10/1998 | Sunakawa et al. |
| 8,751,861 B2 | 6/2014 | Nair et al. |
| 9,612,751 B2 | 4/2017 | Basak et al. |
| 10,521,289 B2 | 12/2019 | Adamson et al. |
| 10,732,860 B2 | 8/2020 | Killamsetti et al. |
| 10,776,276 B2 | 9/2020 | Shergill et al. |
| 10,785,350 B2 | 9/2020 | Barszczak et al. |
| 11,030,107 B2 | 6/2021 | Shergill et al. |
| 2007/0256110 A1* | 11/2007 | Russ .................. H04N 21/23 725/139 |
| 2013/0074091 A1 | 3/2013 | Xavier et al. |
| 2014/0130055 A1 | 5/2014 | Guha |
| 2018/0337794 A1 | 11/2018 | Casaletto et al. |

(Continued)

FOREIGN PATENT DOCUMENTS

| | | |
|---|---|---|
| CA | 2651105 C | 4/2012 |
| GB | 2524243 A | 9/2015 |

*Primary Examiner* — Mardochee Chery
(74) *Attorney, Agent, or Firm* — Trop, Pruner & Hu, P.C.

(57) ABSTRACT

In some examples, a computer system computes a rate of operations that involves a first system, and classifies, using a classifier, a request for an operation. The computer system determines a relationship between the computed rate of operations and a dynamic threshold rate determined during a training phase, and based on the determined relationship and a classification of the request by the classifier, selectively activates or disables an operational feature of the first system.

20 Claims, 7 Drawing Sheets

(56) References Cited

U.S. PATENT DOCUMENTS

2022/0229553 A1 7/2022 Das et al.
2022/0334947 A1 10/2022 Lecrone et al.

* cited by examiner

OPERATIONAL FEATURE ACTIVATION/DISABLING

BACKGROUND

Various operations can be performed in systems. An example of a system includes a storage system that can respond to access requests from data requesters to access (read or write) data stored by the storage system. In other examples, systems can include other types of electronic devices, and operations can include communication operations, client-server operations, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Operations involving systems may be associated with various operational characteristics that relate to a performance level of operations and/or a rate at which the operations are proceeding. An example of a performance level of operations includes a latency or response time of the operations.

A rate of operations can refer to a quantity of activities of the operations per unit time.

A latency of operation can refer to how quickly the operation can complete once started. A lower latency refers to a shorter time for the operation to complete once started. In some examples, latency can be expressed as a response time. A response time of an operation can refer to how quickly an indication of a completion of the operation is provided from a start of the operation. A lower response time refers to a shorter delay between a start of an operation and when an indication of a completion of the operation is provided. In other examples, other operational characteristics that relate to performance levels of operations can be employed.

A storage operation can refer to an operation in which data is accessed, such as read or written. For example, a data requester can issue a data access request (read request or write request) to a storage system, which performs a corresponding storage operation to access data stored by the storage system. The "data requester" can refer to a machine, a program, or a user. A "storage system" can refer to a collection of storage devices and a storage controller that manages access of the collection of storage devices in response to receiving a data access request. A "collection" of storage devices can refer to a single storage device or multiple storage devices. A "storage device" can refer to any or some combination of a disk-based storage device, a solid-state storage device, and so forth.

In the context of storage operations, a rate of the storage operations can be expressed as an input/output (I/O) rate, which can refer to the rate at which I/O activities relating to data access are occurring per unit time. An I/O activity can refer to a transfer of data (e.g., a quantity of data blocks or other data segments), or a transfer of control information, or any other activity relating to access of data of a storage system.

In the context of storage operations, latency can refer to how quickly a data access is completed from when the data access is started. A latency of a storage operation provides a measure of a duration of the storage operation, which is measured from when a data access request is issued to when the storage operation initiated by the data access request is completed, based on an indication of completion of the storage operation. In some cases, the indication of completion of the storage operation can be sent by a storage system to a data requester. In examples where latency is expressed as a response time, the response time of a storage operation can refer to how quickly a data access request is acknowledged as being completed.

Other types of operations between systems can include communication operations, client-server operations, and so forth. Communication operations involve a communication of information between systems, such as over a network. In the context of communication operations, a rate of operations can refer to a quantity of information communicated between the systems per unit time, and latency can refer to how quickly a requested transfer of information is completed between the systems.

Client-server operations can refer to an operation in which a client (e.g., a machine, a program, or a user) issues a request to a server (e.g., a machine or a program), to cause the server to perform a requested operation (e.g., launch a program, present a user portal, etc.). In the context of client-server operations, a rate of operations can refer to a quantity of activities performed in response to client requests per unit time, and latency can refer to how quickly a requested activity requested by the client is completed.

In further examples, there can be other types of operations between systems (two or more systems).

A "system" can refer to a computer, a communication node, a storage system, a vehicle, a controller in a vehicle, a game appliance, a home appliance, an Internet-of-Things (IoT) device, and so forth. Operations between systems can refer to operations between hardware components, between programs, between hardware components and programs, and so forth.

There can be a relationship between latency and a rate of operations. As a rate of operations increases, latency may remain relatively constant or can rise a relatively small amount. However, a saturation point may be reached at which any further increase in the rate of operations can cause latency to rise sharply (discussed further in connection with FIG. 2 below).

In some examples, controlling a behavior of systems based on use of a fixed threshold may not provide optimal results. For example, an operational feature of a system can be disabled upon a quantity of operations exceeding the fixed threshold. However, this reduces flexibility in how a system is able to operate, and the fixed threshold may not be optimally set.

In accordance with some implementations of the present disclosure, dynamic operational feature control techniques or mechanisms are provided to selectively activate or disable an operational feature of operations based on determining a relationship between a computed rate of operations and a dynamic threshold rate determined during a training phase, and based on a classification, by a classifier, of a request that initiated an operation. A "rate of operations" refers to a quantity of operations per unit time (i.e., the rate of operations is a derivative of the quantity of operations over time). A "classifier" can refer to a program or a model that is able to perform machine learning based on training data.

Figure 1A:
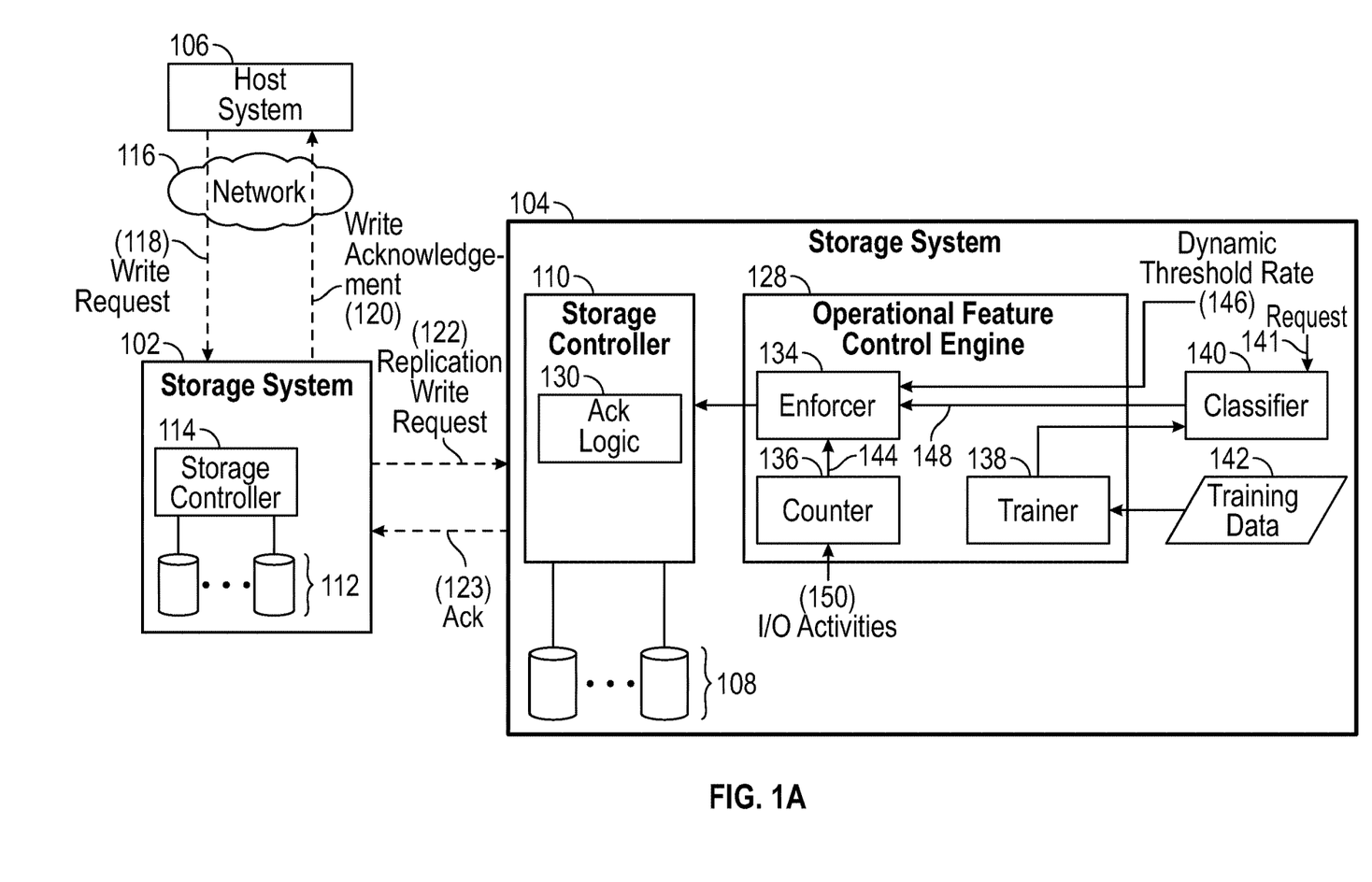
FIGS. 1A and 1B are block diagrams of arrangements that include host and storage systems, according to some examples.

FIG. 1A is a block diagram of an example arrangement that includes storage systems 102 and 104, and a host system 106. A "host system" can refer to any electronic device that is able to access the storage system 102 and/or the storage system 104. In some examples, synchronous replication can be performed between the storage systems 102 and 104, such that any write that results in data stored in the storage system 102 being modified would cause the same data modification to be reflected in the storage system 104 (and vice versa). In some examples, the storage system 102 can be referred to as a primary storage system and the storage system 104 can be referred to as a secondary storage system with which synchronous replication is performed such that the secondary storage system maintains a copy of data of the primary storage system. In further examples, for other host systems, the storage system 104 is a primary storage system, and the storage system is a secondary storage system.

Although reference is made to an example arrangement in which synchronous replication is performed to replicate write data between multiple storage systems, it is noted that in other examples, one of the storage systems 102 and 104 can be omitted and no synchronous replication is performed, such as shown in FIG. 1A. Also, in further examples, there can be more than two storage systems.

Although FIG. 1A shows an example in which there is just one host system 106, in other examples, there can be multiple host systems that are able to access data in the storage system 102 and/or the storage system 104.

In some examples, the host system 106 can issue a write request 118 to a target entity (such as the storage system 102 or a server computer or another entity), which can trigger a storage operation to write data in the storage system 102. In examples where synchronous replication is performed, the storage system 102 can initiate a synchronous replication with another entity (e.g., the storage system 104 or a server computer or another entity) to replicate the write data to the storage system 104. The storage system 102 can initiate the synchronous replication by sending a replication write request 122 to the storage system 104, for example.

The storage system 102 includes a collection of storage devices 112 and a storage controller 114 that manages access of data in the collection of storage devices 112. Similarly, the storage system 104 includes a collection of storage devices 108 and a storage controller 110 to manage access of data in the collection of storage devices 108.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

Each storage system 102 or 104 also includes a network interface (not shown) to allow the storage system to communicate over a network, such as a network 116. The network 116 can include a local area network (LAN), a wide area network (WAN), a public network (such as the Internet), a storage area network (SAN), and so forth.

In the example of FIG. 1A, the host system 106 can issue data access requests over the network 116 to the storage system 102. In some examples, a host system issuing a data access request to a storage system can refer to the host system sending the data access request to the storage system without the data access request being processed by an intermediate device, or alternatively, can refer to the host system sending the data access request to an intermediate device (such as a server computer) that processes the data access request and then forwarding a corresponding data access request to the storage system.

In the example of FIG. 1A, a write request 118 is issued by the host system 106 to the storage system 102. The host system 106 may issue multiple write requests to the storage system 102.

Upon completion of a storage operation responsive to the write request 118, the storage controller 110 can send a write acknowledgment 120 back to the host system 106, to indicate completion of the storage operation requested by the write request 118.

The write acknowledgment 120 is an example of an indication of completion of a write operation, which in the example of FIG. 1A is initiated by the write request 118. The write request 118 causes write data to be written to the collection of storage devices 112, and the synchronous replication (initiated by the replication write request 122) of the write data to the storage system 104.

In examples where synchronous replication is performed between the storage systems 102 and 104, the storage controller 114 in the storage system 102 does not send the write acknowledgment 120 of the write request 118 to the host system 106 until after the storage system 104 has indicated to the storage system 102 that the synchronous replication of the write data to the storage system 104 has completed. Note that the synchronous replication of the write data can be considered to be completed when the write data is written to a write cache memory (not shown) in the storage controller 110 of the storage system 104. In examples where a synchronous replication is performed, the write acknowledgement 120 of the write request 118 may be delayed as compared to examples where the synchronous replication is not performed. In examples where the synchronous replication is not performed, the storage controller 114 in the storage system 102 can acknowledge the write request 118 once the write operation in the storage system 102 is complete (i.e., the storage controller 110 does not have to wait for completion of the synchronous replication before sending the write acknowledgment 120).

In some examples, the storage controller 110 in the storage system 104 can send a write acknowledgment 123 of the replication write request 122 from the storage system 102 in response to completion of the replication write operation at the storage system 104. The write acknowledgment 123 sent by the storage controller 110 of the storage system 104 to the storage system 102 can be an individual write acknowledgment of a corresponding replication write request, such as the replication write request 122. An "individual write acknowledgement" refers to an acknowledgment of an individual write request that does not acknowledge another write request. In examples where synchronous replications are performed between storage systems in response to write requests from host systems, using individual write acknowledgments of replication write requests can reduce latency of write operations (assuming a saturation point of the storage system 104 has not been reached, as explained further below). An individual write acknowledgment from the storage system 104 to the storage system 102 allows a quicker acknowledgment of completion of the synchronous replication operation, which allows a quicker response (the write acknowledgement 120) from the storage system 102 to the host system 106. In other examples, the write acknowledgment 123 is a group write acknowledgment that is an acknowledgment of a group of replication write requests, including the replication write request 122 and other write request(s). The latency associated with a group write acknowledgment can be higher than the latency associated with an individual write acknowledgment. An individual write acknowledgment can be sent to the storage system 102 as soon as an individual replication write operation responsive to a replication write request has completed. However, a group write acknowledgment is not sent from the storage system 104 to the storage system 102 until replication write operations of a group of write requests have completed. For example, in a sequence of replication write requests starting with replication write request 1 and ending with replication write request N (where N≥2), the storage system 102 does not receive a group write acknowledgment of replication write request 1 until completion of replication write request N, which adds to the latency associated with replication write request 1.

However, using a group write acknowledgment is associated with lower usage of resources, including communication resources of a communication link between the storage systems 102 and 104, and processing and memory resources of the storage system 104. Instead of having to individually acknowledge N replication write requests using respective N individual write acknowledgments, the storage controller 110 can instead acknowledge N write requests with a single group write acknowledgment, which results in reduced usage of processing resources of the storage controller 110 in issuing write acknowledgments, and reduced usage of the network interface in the storage controller 104 as well as communication resources of routers and/or switches associated with transmission of write acknowledgments from the storage system 104 to the storage system 102. Reducing usage of resources of the storage system 104 can allow for a reduction in latency as a rate of I/O activities increases (discussed further in connection with FIG. 2 below).

Although reference is made to a group write acknowledgment of multiple replication write requests from the storage system 102, in other examples, a group write acknowledgment can be of write requests issued by multiple storage systems.

Moreover, although reference is made to selectively activating or disabling individual write acknowledgments of replication write requests, in further examples, the selective activation/disabling can be of individual write acknowledgments for write requests from host systems. In some examples, a storage system may use an individual write acknowledgment of a replication write request as a default, and may activate a group write acknowledgment if the individual write acknowledgment is disabled. In this context, "activating" an individual write acknowledgment refers to maintaining enabled the individual write acknowledgment that is already active by default. When the individual write acknowledgment feature is activated, the group write acknowledgment feature is disabled.

Providing an individual write acknowledgment is an example of an operational feature of the storage system 104. In some examples, if an individual write acknowledgment feature is activated, the storage controller 110 is able to issue individual write acknowledgments of replication write requests from the storage system 102 (and possibly other storage system(s)). However, if the individual write acknowledgment feature is disabled, then the storage controller 110 would not issue individual write acknowledgments of write requests, but instead issues a group write acknowledgment of write requests.

In FIG. 1A, the issuance of a write acknowledgment (an individual write acknowledgment or a group write acknowledgment) is performed by an acknowledgment logic 130 of the storage controller 110. A "logic" of the storage controller 110 can refer to a portion of the hardware processing circuit of the storage controller 110, or to machine-readable instructions executable by the storage controller 110.

Figure 1B:
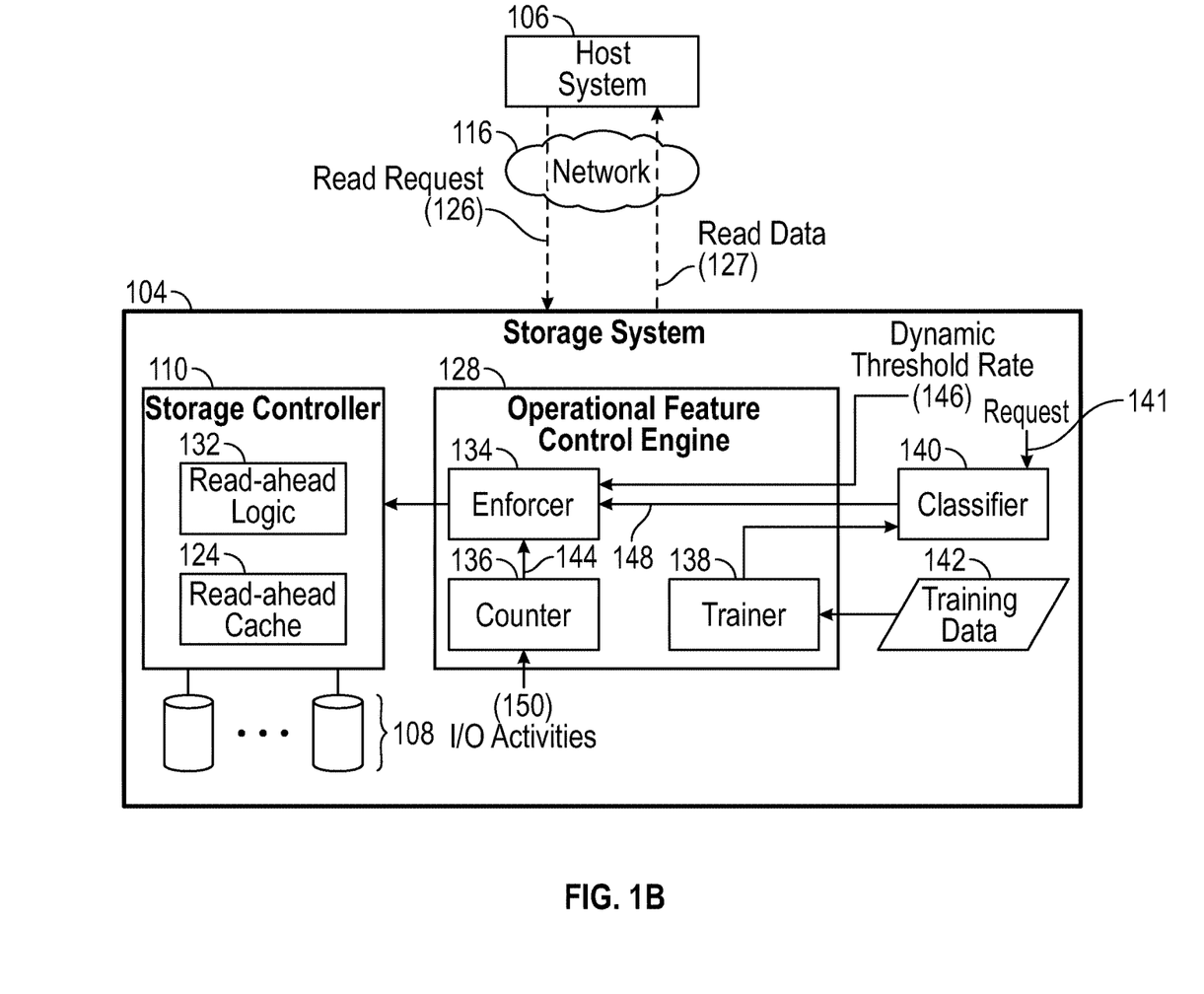

In further examples, as shown in FIG. 1B, another operational feature is a read-ahead feature of the storage system 104, in which the storage controller 110 is able to perform read ahead of unrequested data so that data can be read from the collection of storage devices 108 into a read-ahead cache memory 124 of the storage controller 110 even though the read ahead data was not requested by a read request (e.g., a read request 126) from the host system 106 (or another host system). In the example of FIG. 1B, it is assumed that the storage system 104 is able to receive the read request 126 from the host system 106, and respond with read data 127 retrieved by the storage controller 110. Note that both the acknowledgment logic 130 and the read-ahead logic 132 can be present in the storage controller 110 in some examples.

Note further that the storage system 102 can include similar components as the storage system 104 shown in FIG. 1A and/or FIG. 1B.

In response to the read request 126 from the host system 106, if a read-ahead feature is activated, a read-ahead logic 132 in the storage controller 110 can perform read ahead of additional data from the collection of storage devices 108, in addition to the data requested by the read request 126. The additional data that is the subject of the read ahead is retrieved from the collection of storage devices 108 and stored in the read-ahead cache memory 124. In some examples, the read-ahead cache memory 124 is implemented using a memory (a memory device or multiple memory devices) having a data access speed that is greater than a data access speed of the collection of storage devices 108. The read-ahead cache memory 124 can be implemented using any or some combination of the following: a dynamic random access memory (DRAM), a static random access memory (SRAM), a flash memory, and so forth.

Once the additional data is stored in the read-ahead cache memory 124, a subsequent read request from the host system 106 or from another host system can be satisfied from the read-ahead cache memory 124, if the subsequent read request is for data that is present in the read-ahead cache memory 124. If data requested by the subsequent read request is not in the read-ahead cache memory 124, then the storage controller 110 retrieves the data from the collection of storage devices 108.

If the read-ahead feature is disabled, the read-ahead logic 132 of the storage controller 110 does not perform read ahead of data in response to read requests.

The read-ahead feature may be beneficial in cases where multiple read requests from host system(s) seek sequential segments of data in the collection of storage devices 108. "Sequential" segments of data can refer to data segments that reside at consecutive addresses in the collection of storage devices 108. However, for "random" read requests that do not access data segments at consecutive addresses, activating the read-ahead feature may not be beneficial, and may in fact add latency to read operations requested by the random read requests due to increased resource usage in the storage system 102 associated with read-ahead operations. A random read request refers to a read request that accesses an address in storage at random, i.e., the accessed address is not part of a sequence of addresses referring to consecutive storage locations in the storage (e.g., the collection of storage devices 108). For example, different random read requests can access different addresses in the storage that may be far apart from one another in in the storage.

In accordance with some implementations of the present disclosure, as shown in FIGS. 1A and 1B, the storage system 104 includes an operational feature control engine 128 that is able to selectively activate or disable an operational feature (or multiple operational features) of the storage system 104, including the individual write acknowledgment feature and/or the read-ahead feature.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Operational features that can be activated or disabled can include any or some combination of the following: the individual write acknowledgment feature, the read-ahead feature, and so forth. In the storage system 104 of FIG. 1A, if the individual write acknowledgment feature is activated, the storage controller 110 (or more specifically, the acknowledgement logic 130 of the storage controller 110) is able to issue individual write acknowledgments of write requests. However, if the individual write acknowledgment feature is disabled, then the acknowledgment logic 130 issues a group write acknowledgment of a group of write requests, instead of issuing individual write acknowledgments for the write requests in the group.

The selective activation or disabling of operational features of the storage system 104 can be performed by the operational feature control engine 128. In some examples, the operational feature control engine 128 includes an enforcer 134, a counter 136, and a trainer 138. The enforcer 134, the counter 136, and the trainer 138 can be implemented using a portion of the hardware processing circuit of the operational feature control engine 128, or machine-readable instructions executable by the operational feature control engine 128.

The operational feature control engine 128 uses a classifier 140, which can be in the form of a model or program that can be modified based upon training data 142.

Although FIG. 1A or 1B shows the operational feature control engine 128, the classifier 140, and the training data 142 as being part of the storage system 104, in other examples, the operational feature control engine 128 and/or the classifier 140 and/or and the training data 142 may be separate from the storage system 104, and may be implemented in a separate computer system, for example.

The enforcer 134 is able to selectively activate or disable the individual write acknowledgment feature and/or the read-ahead feature. Specifically, in FIG. 1A, the enforcer 134 is able to provide a first control indication to the acknowledgment logic 130 of whether the individual write acknowledgment feature is activated or disabled. The first control indication can include a message, an information element, a signal, or any other indicator that is settable to different values, including a first value to indicate that the individual write acknowledgment feature is activated, and a different second value to indicate that the individual write acknowledgment feature is disabled. If the individual write acknowledgment feature is disabled, then the acknowledgment logic 130 performs group write acknowledgment of requests.

The enforcer 134 is able to provide a second control indication to the read-ahead logic 132 in FIG. 1B of whether the read-ahead feature is activated or disabled. The second control indication can include a message, an information element, a signal, or any other indicator that is settable to different values, including a first value to indicate that the read-ahead feature is activated, and a different second value to indicate that the read-ahead feature is disabled. If the read-ahead feature is disabled, then the read-ahead logic 132 does not perform read ahead of data from the collection of storage devices 108 in response to a read request.

The enforcer 134 controls the activation and disabling of an operational feature of the storage system 104 in response to various inputs, including an I/O count 144 from the counter 136, a dynamic threshold rate 146, and a classification assignment 148 provided by the classifier 140.

The counter 136 counts I/O activities 150 in the storage system 102. For the individual write acknowledgment feature, the I/O activities 150 counted by the counter 136 include I/O activities relating to write operations. For the read-ahead feature, the I/O activities 150 counted by the counter 136 include read activities. In some examples, there can be multiple counters 136, including one counter for counting write activities for determining whether or not the individual write acknowledgment feature is to be activated or disabled, and another counter to count read activities for determining whether or not the read-ahead feature is to be activated or disabled. An "I/O activity" can refer to a quantity of data (e.g., quantity of data blocks or other segments, etc.). A "write activity" can refer to a quantity of write data, and a "read activity" can refer to a quantity of read data.

The I/O count 144 from the counter 136 can be updated at different times. For example, at scheduled sampling time intervals, the counter 136 can start counting I/O activities during each sampling time interval. The enforcer 134 can divide a new I/O count for a current sampling time interval by the amount of time of the current sampling time interval, to derive an updated I/O rate to be used in deciding whether an operational feature is to be activated or disabled.

The dynamic threshold rate 146 can be set during a training phase of the storage system 104. In the storage system 104 of FIG. 1B, the dynamic threshold rate 146 is for use in selectively activating or disabling the individual write acknowledgment feature. In the storage system 104 of FIG. 1A, the dynamic threshold rate 146 is for use in selectively activating or disabling the read-ahead feature.

The training phase of the storage system 104 refers to a phase during which the enforcer 134 is deactivated such that the individual write acknowledgment feature is activated and/or the read-ahead logic 132 is activated. During the training phase in FIG. 1A, replication write requests are submitted from the storage system 102 to the storage system 104. The replication write requests during the training phase can include actual requests issued by storage system(s) to trigger replication write operations, or alternatively, can include training replication write requests designed to check operational characteristics of the storage system 104 when the individual write acknowledgment feature is activated.

During the training phase in FIG. 1B, read requests are submitted to the storage system 104. The read requests during the training phase can include actual requests issued by host system(s), or alternatively, can include training read requests designed to check operational characteristics of the storage system 104 when the read-ahead feature is activated.

Also, during the training phase or in a separate classifier training phase, the training data 142 can be used by the trainer 138 to train the classifier 140. Training a classifier can refer to updating the classifier so that the classifier's ability to classify an input (e.g., a write request or a read request) is changed. The training data 142 can include labeled data that can include labels assigned to different types of requests. For example, in FIG. 1A, certain types of replication write requests may be more sensitive to latency than other types of replication write requests. A type of replication write request that is not sensitive to latency includes a bulk replication write request. An example of a bulk replication write request can include a replication write request that is part of a large group of replication write requests to copy large quantities of sequential data to a storage system, such as when the storage systems 102 and 104 initially start up and bulk replication write requests are issued to synchronize the data in the storage systems 102 and 104. A different type of replication write request is an interactive replication write request, which is a replication write request issued by the storage system 102 to the storage system 104 in response to a host write request from the host system 106. An interactive replication write request is more sensitive to latency than a bulk replication write request, since in the case of the interactive replication write request a host system is waiting for a write acknowledgment from the storage system 102. In contrast, bulk replication write requests may be performed in the background and thus delays associated with acknowledging replication bulk write requests may not have a large impact in overall system performance.

In FIG. 1B, certain types of read requests may benefit more from the read-ahead feature than other types of read requests. A type of read request that benefits from the read-ahead feature is a sequential read request. A sequential read request can refer to a request that is part of a collection of read requests that access sequential data segments in a collection of storage devices. A type of read request that may not benefit from the read-ahead feature is a random read request.

In accordance with some implementations of the present disclosure, the enforcer 134 computes an I/O rate based on the I/O count 144 from the counter 136 divided by a specified unit time (e.g., the unit time of a sampling time interval during which I/O activities are counted by the counter 136). The enforcer 134 determines a relationship of the computed I/O rate with respect to the dynamic threshold rate 146 (e.g., whether the computed I/O rate exceeds the dynamic threshold rate 146), and also determines the classification assignment 148 from the classifier 140, which assigns a category (from among multiple different categories) to a request 141 that is presently being processed by the storage controller 110. The request 141 can include a replication write request (e.g., 122 in FIG. 1A) or a read request (e.g., 126 in FIG. 1B).

Based on the determined relationship between the computed I/O rate and the dynamic threshold rate 146, and based on the category assignment from the classifier 140, the enforcer 134 can decide whether to activate or disable an operational feature (e.g., the individual write acknowledgment feature and/or the read-ahead feature). Based on this determination, the enforcer 134 can provide the first control indication or the second control indication to the write acknowledgment logic 130 (FIG. 1A) or the read-ahead logic 132 (FIG. 1B), respectively.

Figure 2:
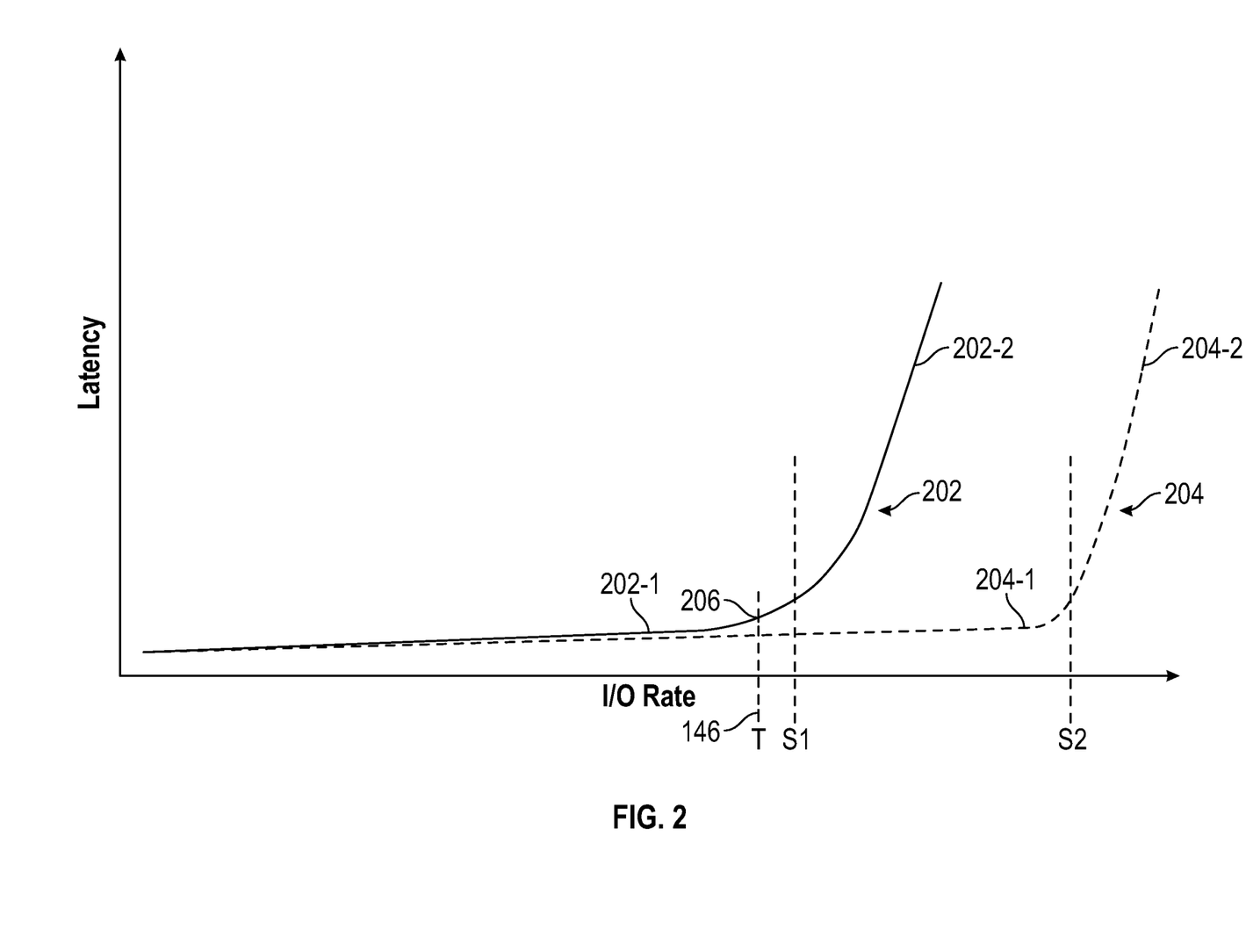
FIG. 2 is a graph illustrating a curve representing a relationship between latency and input/output (I/O) rate, according to some examples.

The trainer 138 (or another entity) is able to set the dynamic threshold rate 146 during a training phase of the storage system 104. FIG. 2 shows curves 202 and 204 that represent respective relationships between latency and I/O rate. The I/O rate of FIG. 2 refers to a rate of I/O activities in a storage system, such as the storage system 104 of FIG. 1A or 1B.

The curve 202 represents a relationship between latency and I/O rate assuming that an operational feature is activated (e.g., the individual write acknowledgment feature is activated and/or the read-ahead feature is enabled). The curve 204 represents a relationship between latency and I/O rate when the operational feature is disabled (e.g., the group acknowledgment feature is activated and/or read-ahead feature is disabled).

The curve 202 has a first curve portion 202-1 and a second curve portion 202-2. The first curve portion 202-1 is before a first saturation point S1, and the second curve portion 202-2 is after the saturation point S1. A "saturation point" refers to a given I/O rate associated with a system, such as the storage system 104, at which any further increase in the I/O rate would cause a sharp rise in latency experienced by operations involving the system. In the first curve portion 202-1, the latency increases by a relatively small amount with increasing I/O rate. However, in the second curve portion 202-2 after the saturation point S1, any further increase in the I/O rate above S1 would cause a sharp increase in the latency.

In accordance with some implementations of the present disclosure, the enforcer 134 of the operational feature control engine 128 can selectively disable an operational feature of the storage system 104 (e.g., the individual write acknowledgment feature or the read-ahead feature) to cause an increase in value of the saturation point (to change behavior from the curve 202 to the curve 204). For example, the curve 204 has a saturation point S2 that is greater than the saturation point S1 of the curve 202.

The curve 204 has a first curve portion 204-1 and a second curve portion 204-2, where the first curve portion 204-1 has longer length before the saturation point S2 than a length of the curve portion 202-1 before the saturation point S1. In other words, as represented by the curve 204, with an operational feature disabled (e.g., the individual write acknowledgment feature and/or the read-ahead feature disabled), the system (e.g., the storage system 104) can operate at a higher I/O rate before reaching the saturation point S2.

Following the saturation point S2, latency sharply increases with I/O rate, as represented by the second curve portion 204-2.

In accordance with some implementations of the present disclosure, during a training phase, the trainer 138 (or another entity) can observe the relationship between latency and I/O rate as requests are executed by the storage system 104. For purposes of determining the dynamic threshold rate 146 for the individual write acknowledgment feature in FIG. 1A, the observed relationship is between latency of write requests and I/O rate of write activities. For the dynamic threshold rate 146 for the read-ahead feature in FIG. 1B, the observed relationship is between latency of read requests and the I/O rate of read activities.

The observed relationship between latency and I/O rate for requests can be based on measurements provided by monitoring agents in the storage system 104. The measurements can include measurements representing latency, as well as I/O counts from the counter 136 that can be used to compute I/O rate during the training phase.

The dynamic threshold rate 146 may be set by the trainer 138 or another entity during the training phase, based on the observed relationship as represented by the curve 202, for example. In some examples, the dynamic threshold rate 146 can be set to a value that is lower than the saturation point S1. For example, the dynamic threshold rate 146 can be set as an I/O rate corresponding to a point 206 on the curve 202 at which the latency rises by greater than some specified slope. In other examples, the dynamic threshold rate 146 can be set equal to the saturation point S1.

The dynamic threshold rate 146 can be continually updated by performing new training phases. An administrator may cause a new training phase to be performed, or the operational feature control engine 128 can invoke the new training phases in response to detecting events, such as an event indicating that a performance of the storage system 102 is lagging or otherwise does not satisfy a specified goal.

Figure 3:
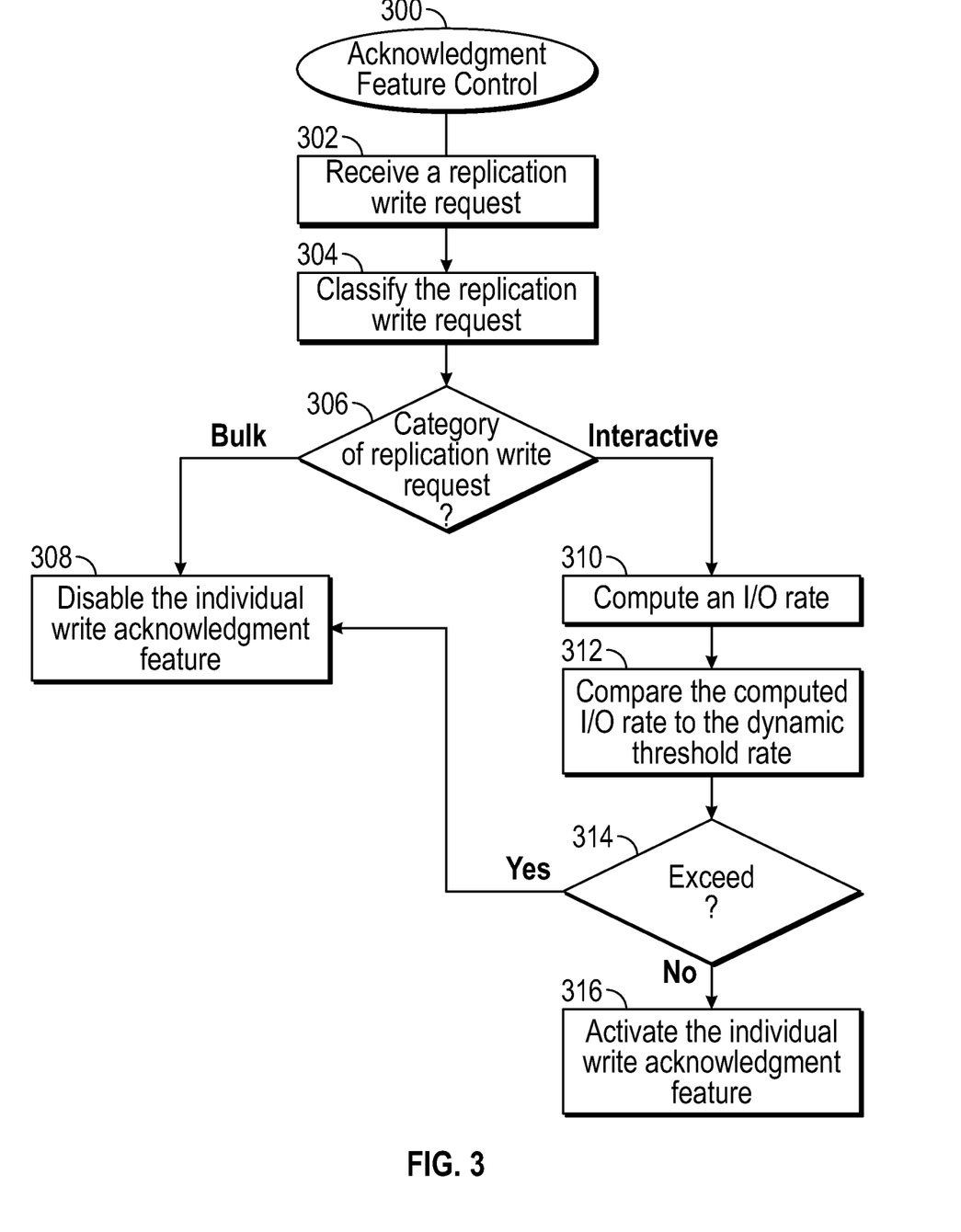
FIG. 3 is a flow diagram of an acknowledgment feature control process, according to some examples.

FIG. 3 is a flow diagram of a process 300 of selectively activating or disabling the individual write acknowledgment feature, according to some examples.

The storage system 104 receives (at 302) a replication write request, such as the replication write request 122 in FIG. 1A.

The classifier 140 classifies (at 304) the replication write request 122 by assigning a category (selected from among multiple different categories) to the replication write request 122. In some examples, the different categories include an interactive category and a bulk category. The classifier 140 assigns the interactive category to the replication write request 122 if the replication write request 122 is an interactive replication write request. The classifier 140 assigns the bulk category to the replication write request 122 if the replication write request 122 is a bulk replication write request.

The enforcer 134 determines (at 306) whether the replication write request 122 has been assigned the interactive category or the bulk category. In response to determining that the replication write request 122 has been assigned the bulk category, the enforcer 134 disables (at 308) the individual write acknowledgment feature by sending the first control indication to the write acknowledgment logic 130 (FIG. 1A) to cause the write acknowledgment logic 130 to disable the individual write acknowledgment feature, such that the write acknowledgment logic 130 uses the group acknowledgment feature.

In response to determining that the replication write request 122 has been assigned the interactive category, the enforcer 134 computes (at 310) an I/O rate based on the I/O count 144 from the counter 136. In some examples, the counter 136 can include in the I/O count a count of I/O activities associated with the received replication write request 122.

The enforcer 134 further compares (at 312) the computed I/O rate to the dynamic threshold rate 146 for the individual write acknowledgment feature. In response to determining (at 314) that the computed I/O rate does not exceed the dynamic threshold rate 146, the enforcer 134 activates (at 316) the individual write acknowledgment feature using the first control indication, such that the write acknowledgment logic 130 issues an individual write acknowledgment in response to the replication write request 122. However, if the computed I/O rate exceeds the dynamic threshold rate 146, the enforcer 134 disables (at 308) the individual write acknowledgment feature by using the first control indication, to cause the write acknowledgment logic 130 (FIG. 1A) to issue a group write acknowledgment in response to a group of replication write requests.

Figure 4:
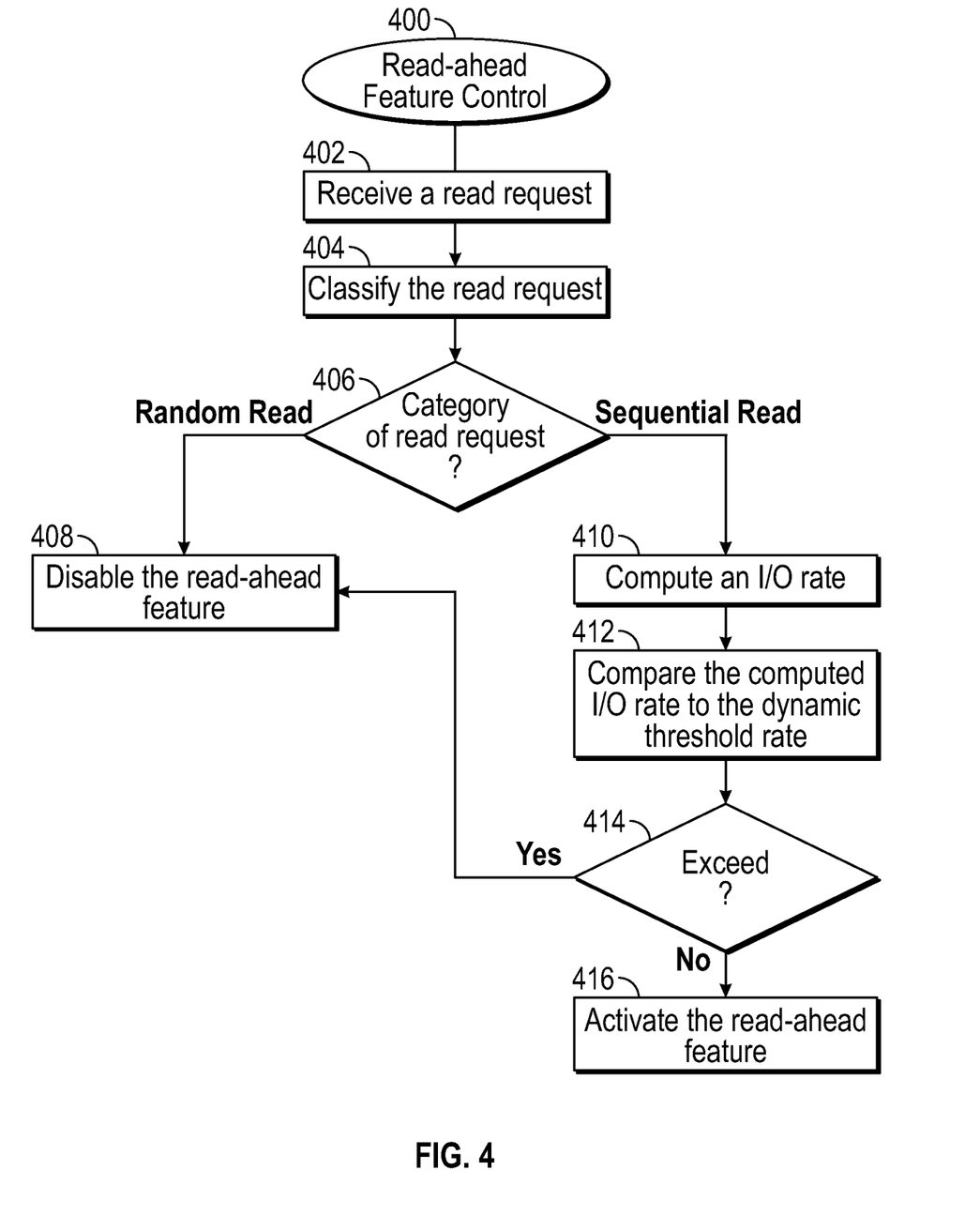
FIG. 4 is a flow diagram of a read-ahead feature control process, according to some examples.

FIG. 4 is a flow diagram of a process 400 of selectively activating or disabling the read-ahead feature, according to some examples.

The storage system 104 receives (at 402) a read request, such as the read request 126 in FIG. 1B.

The classifier 140 classifies (at 404) the read request 126 by assigning a category (selected from among multiple different categories) to the read request 126. In some examples, the different categories include a sequential read category and a random read category. The classifier 140 assigns the sequential read category to the read request 126 if the read request 126 is a sequential read request. The classifier 140 assigns the random read category to the read request 126 if the read request 126 is a random read request.

The enforcer 134 determines (at 406) whether the read request 126 has been assigned the sequential read category or the random read category. In response to determining that the read request 126 has been assigned the random read category, the enforcer 134 disables (at 408) the read-ahead feature by sending the second control indication to the read-ahead logic 132 to cause the read-ahead logic 132 to disable the read-ahead feature, such that the read-ahead logic 132 does not perform read ahead for the read request 126.

In response to determining that the read request 126 has been assigned the sequential read category, the enforcer 134 computes (at 410) an I/O rate based on the I/O count 144 from the counter 136. The enforcer 134 further compares (at 412) the computed I/O rate to the dynamic threshold rate 146 for the read-ahead feature. In response to determining (at 414) that the computed I/O rate does not exceed the dynamic threshold rate 146, the enforcer 134 activates (at 416) the read-ahead feature using the second control indication, such that the read-ahead logic 132 performs read ahead in response to the read request 126. However, if the computed I/O rate exceeds the dynamic threshold rate 146, the enforcer 134 disables (at 408) the read-ahead feature by using the second control indication, to cause the read-ahead logic 132 (FIG. 1B) to not perform read ahead for the read request 126.

Figure 5:
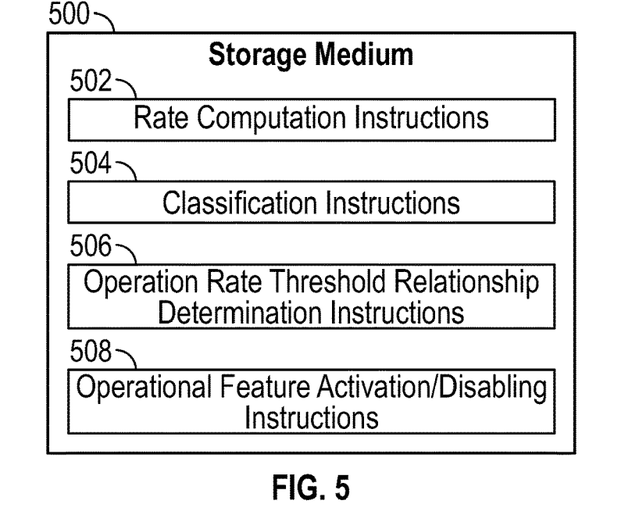
FIG. 5 is a block diagram of a storage medium storing machine-readable instructions according to some examples.

FIG. 5 is a block diagram of a non-transitory machine-readable or computer-readable storage medium storing machine-readable instructions that upon execution cause a computer system to perform various tasks. The computer system can be part of a storage system, such as the storage system 104 or 102. Alternatively, the computer system can be separate from a storage system.

The machine-readable instructions include rate computation instructions 502 to compute a rate of operations that involves a first system (e.g., the storage system 104 of FIG. 1A or 1B). The computed rate of operations can include an I/O rate, for example, such as based on the I/O count 144 from the counter 136 divided by a unit time.

The machine-readable instructions include classification instructions 504 to classify, using a classifier, a request for an operation, such as a read request or a write request (e.g., a replication write request).

The machine-readable instructions include operation rate threshold relationship determination instructions 506 to determine a relationship between the computed rate of operations and a dynamic threshold rate determined during a training phase (e.g., determine whether the computed rate of operations exceeds the dynamic threshold rate).

The machine-readable instructions include operational feature activation/disabling instructions 508 to, based on the determined relationship and a classification of the request by the classifier, selectively activate or disable an operational feature of the first system.

In some examples, selectively activating or disabling the operational feature includes selectively activating or disabling an individual write acknowledgment of the request from a second system (e.g., the storage system 102 of FIG. 1A). Selectively disabling the individual write acknowledgment allows for a reduction in a rate of increase of latency of operations with an increasing rate of operations.

In some examples, disabling the operational feature includes disabling the individual write acknowledgment of the request and activating a group write acknowledgment of a group of requests including the request. A group write acknowledgment consumes less resources than an individual write acknowledgment, which leads to more efficient resource usage.

In some examples, disabling the individual write acknowledgment and activating the group write acknowledgment are performed when the rate of operations exceeds the dynamic threshold rate, and activating the individual write acknowledgement is performed when the rate of operations does not exceed the dynamic threshold rate.

In some examples, classifying a write request (e.g., a replication write request) includes classifying the write request as an interactive replication write request from a source storage system to a destination storage system, where selectively activating or disabling the individual write acknowledgment of the request is responsive to classifying the write request as the interactive replication write request. An interactive replication write request is more sensitive to an increase in latency.

In some examples, the classifier classifies a further write request for an operation as a bulk replication write request, and in response to classifying the further write request as the bulk replication write request, the machine-readable instructions disable an individual write acknowledgement of the further write request and activate a group write acknowledgement for the further write request.

In some examples, selectively activating or disabling the operational feature includes selectively activating or disabling read ahead of data by the first system that comprises a storage system. Disabling read ahead of data reduces resource usage and allows for a reduction in a rate of increase of latency of operations with an increasing rate of operations.

In some examples, the request is a read request, and classifying the read request includes classifying the read request as being a sequential read request, where selectively activating or disabling the read ahead of data is in response to classifying the read request as the sequential read request.

In some examples, the classifier classifies a further read request as a random read request, and, in response to classifying the further read request as the random read request, the machine-readable instructions disable read ahead of data for the further read request. Read ahead is more beneficial for sequential read requests and thus the read ahead can be activated for sequential read requests while disabled for random read requests, to optimize usage of resources while allowing for reduced read latency.

In some examples, the machine-readable instructions perform the training phase to update the dynamic threshold rate, where the training phase includes receiving information of operations performed at the first system with the operational feature activated. Updating the dynamic threshold rate allows for more optimal operation of the operational feature control engine 128 of FIG. 1, for example.

In some examples, the machine-readable instructions derive a relationship between rates of the operations performed at the first system during the training phase and performance levels (e.g., latency) of the operations during the training phase. The machine-readable instructions set the dynamic threshold rate based on the derived relationship.

In some examples, the machine-readable instructions train the classifier using training data that is labelled with different categories of requests, the different categories of requests comprising a first category of requests that is sensitive to latency, and a second category of requests that is not sensitive to latency.

Figure 6:
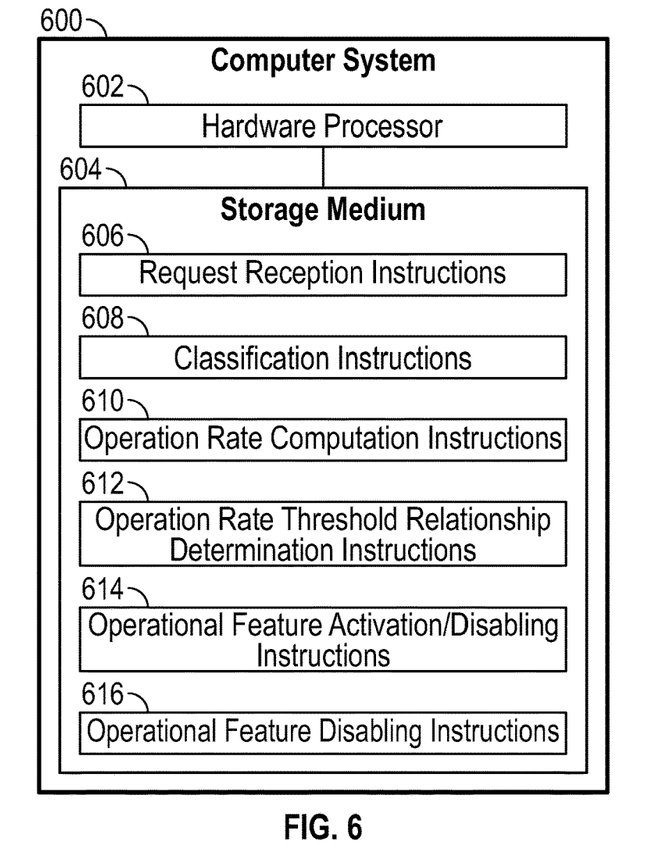
FIG. 6 is a block diagram of a system according to some examples.

FIG. 6 is a block diagram of a computer system 600 that includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The computer system 600 further includes a non-transitory storage medium 604 storing machine-readable instructions that are executable on the hardware processor 602 to perform various tasks. Machine-readable instructions executable on a hardware processor can refer to the machine-readable instructions executable on a single hardware processor or multiple hardware processors.

The machine-readable instructions in the storage medium 604 include request reception instructions 606 to receive a request for an operation at a first system.

The machine-readable instructions in the storage medium 604 include classification instructions 608 to classify, using a classifier, the request, the classifying including assigning the request to an assigned category of a plurality of categories.

The machine-readable instructions in the storage medium 604 include instructions 610, 612, and 614 that are performed in response to determining that the assigned category of the request is a first category of the plurality of categories.

The instructions 610 include operation rate computation instructions to compute a rate of operations that involves the first system.

The instructions 612 include operation rate threshold relationship determination instructions to determine a relationship between the computed rate of operations and a dynamic threshold rate determined during a training phase.

The instructions 614 include operational feature activation/disabling instructions to, based on the determined relationship, selectively activate or disable an operational feature of the first system for the request.

The machine-readable instructions in the storage medium 604 include operational feature disabling instructions 616 to, in response to determining that the assigned category of the request is a second category of the plurality of categories, disable the operational feature.

Figure 7:
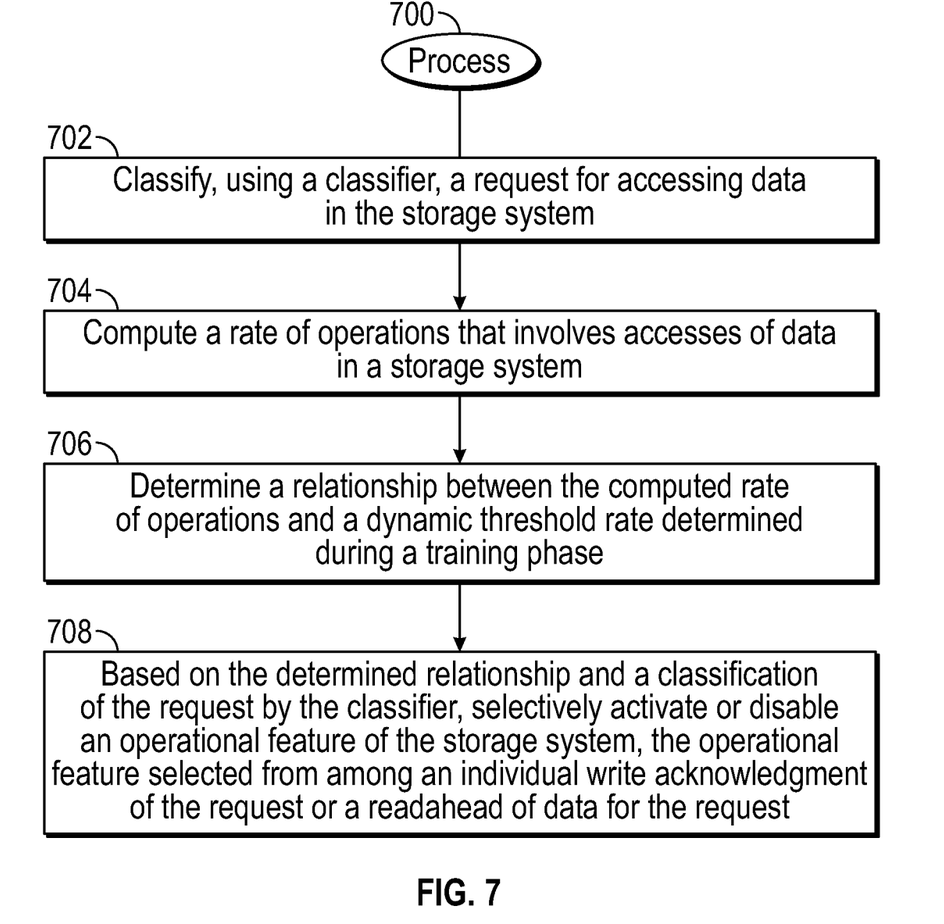
FIG. 7 is a flow diagram of a process according to some examples.

FIG. 7 is a flow diagram of a process 700 according to some examples, which can be performed by a computer system.

The process 700 includes classifying (at 702), using a classifier, a request for accessing data in the storage system.

The process 700 includes computing (at 704) a rate of operations that involves accesses of data in a storage system.

The process 700 includes determining (at 706) a relationship between the computed rate of operations and a dynamic threshold rate determined during a training phase.

The process 700 includes, based on the determined relationship and a classification of the request by the classifier, selectively activating or disabling (at 708) an operational feature of the storage system, the operational feature selected from among an individual write acknowledgment of the request or a read ahead of data for the request.

A storage medium (e.g., 500 in FIG. 5 or 604 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer system to:
   perform a training phase that updates a dynamic threshold rate based on information of operations performed at a first system with an operational feature activated;
   compute a rate of operations that involves the first system;
   classify, using a classifier, a request for an operation;
   determine a relationship between the computed rate of operations and the dynamic threshold rate updated during the training phase; and
   based on the determined relationship and a classification of the request by the classifier, selectively activate or disable the operational feature of the first system for the request.

2. The non-transitory machine-readable storage medium of claim 1, wherein the operational feature is an individual write acknowledgment feature, and selectively activating or disabling the operational feature comprises selectively activating or disabling an individual write acknowledgment of the request.

3. The non-transitory machine-readable storage medium of claim 2, wherein disabling the operational feature comprises disabling the individual write acknowledgment of the request and activating a group write acknowledgment of a group of requests including the request.

4. The non-transitory machine-readable storage medium of claim 3, wherein disabling the individual write acknowledgment and activating the group write acknowledgment are performed based on a determination that the computed rate of operations exceeds the dynamic threshold rate, and wherein activating the individual write acknowledgement is performed based on a determination that the computed rate of operations does not exceed the dynamic threshold rate.

5. The non-transitory machine-readable storage medium of claim 2, wherein the request is a write request to write data to the first system that comprises a storage system, wherein classifying the write request comprises classifying the write request as an interactive replication write request from a second storage system to the storage system, and wherein selectively activating or disabling the individual write acknowledgment of the request is responsive to classifying the write request as the interactive replication write request.

6. The non-transitory machine-readable storage medium of claim 1, wherein the request is a first request, the computed rate of operations is performed at a first time, and classifying the first request comprises classifying the first request as a first type of request from among a plurality of different types of requests, and wherein the instructions upon execution cause the computer system to:
   selectively activate the operational feature for the first request based on classifying the first request as the first type of request and based on a determination that the computed rate of operations performed at the first time does not exceed the dynamic threshold rate;
   compute a rate of operations that involves the first system at a second time;
   classify a second request as the first type of request; and
   based on classifying the second request as the first type of request and based on a determination that the computed rate of operations performed at the second time exceeds the dynamic threshold rate, selectively disable the operational feature for the second request.

7. The non-transitory machine-readable storage medium of claim 5, wherein the instructions upon execution cause the computer system to:
   classify, using the classifier, a further write request for an operation as a bulk replication write request; and
   in response to classifying the further write request as the bulk replication write request, disable an individual write acknowledgement of the further write request and activate a group write acknowledgement for the further write request.

8. The non-transitory machine-readable storage medium of claim 5, wherein the individual write acknowledgment is of the write request that triggers a data replication operation from another storage system to the storage system.

9. The non-transitory machine-readable storage medium of claim 1, wherein the operational feature is a read-ahead feature, and selectively activating or disabling the operational feature comprises selectively activating or disabling read ahead of data by the first system that comprises a storage system.

10. The non-transitory machine-readable storage medium of claim 9, wherein the request is a read request, and wherein classifying the read request comprises classifying the read request as being a sequential read request, and wherein selectively activating or disabling the read ahead of data is in response to classifying the read request as the sequential read request.

11. The non-transitory machine-readable storage medium of claim 10, wherein the instructions upon execution cause the computer system to:
classify, using the classifier, a further read request as a random read request; and
in response to classifying the further read request as the random read request, disable read ahead of data for the further read request.

12. The non-transitory machine-readable storage medium of claim 1, wherein updating the dynamic threshold rate is based on an observed relationship between a rate of operations with the operational feature activated during the training phase and an observed latency associated with the operations during the training phase.

13. The non-transitory machine-readable storage medium of claim 1, wherein the instructions upon execution cause the computer system to:
derive a relationship between rates of the operations performed at the first system during the training phase and performance levels of the operations during the training phase; and
set the dynamic threshold rate based on the derived relationship.

14. The non-transitory machine-readable storage medium of claim 1, wherein the instructions upon execution cause the computer system to:
train the classifier using training data that is labelled with different categories of requests, the different categories of requests comprising a first category of requests that is sensitive to latency, and a second category of requests that is not sensitive to latency.

15. The non-transitory machine-readable storage medium of claim 14,
wherein classifying the request comprises assigning a category of the different categories to the request.

16. A computer system comprising:
a hardware processor; and
a non-transitory storage medium comprising instructions that are executable on the hardware processor to:
perform a training phase that updates a dynamic threshold rate based on information of operations performed at a first system with an operational feature activated;
receive a request for an operation at the first system;
classify, using a classifier, the request, the classifying comprising assigning the request to an assigned category of a plurality of categories; and
based on a determination that the assigned category of the request is a first category of the plurality of categories:
compute a rate of operations that involves the first system,
determine a relationship between the computed rate of operations and the dynamic threshold rate updated during the training phase, and
based on the determined relationship, selectively activate or disable the operational feature of the first system for the request.

17. The computer system of claim 16, wherein the request is a request to access data in a storage system, and the operational feature is a storage operational feature of the storage system, and wherein selectively activating or disabling the storage operational feature of the storage system comprises:
disabling the storage operational feature based on a determination that the computed rate of operations exceeds the dynamic threshold rate, and
activating the storage operational feature based on a determination that the computed rate of operations does not exceed the dynamic threshold rate.

18. The computer system of claim 16, wherein the computed rate of operations is based on a collection of operations including the operation specified by the request.

19. A method of a computer system comprising a hardware processor, comprising:
performing, at the computer system, a training phase that updates a dynamic threshold rate based on information of operations performed at a storage system with an operational feature activated;
classifying, using a classifier in the computer system, a request for accessing data in the storage system;
computing, by the computer system, a rate of operations that involves accesses of data in the storage system;
determining a relationship between the computed rate of operations and the dynamic threshold rate updated during the training phase; and
based on the determined relationship and a classification of the request by the classifier, selectively activating or disabling, by the computer system, the operational feature of the storage system.

20. The method of claim 19, wherein classifying the request comprising assigning the request to an assigned category of a plurality of different categories, wherein selectively activating or disabling the operational feature is responsive to the assigned category being a category that is sensitive to latency of operations.

* * * * *